Patented Apr. 12, 1949

2,466,739

UNITED STATES PATENT OFFICE 2,466,739

2-ACYL-2-(β-CYANOETHYL)-CYCLOALKANONES

Harry R. Raterink, Drexel Hill, and Herman A. Bruson, Rydal, Pa., assignors, by mesne assignments, to Rohm & Haas Company, Philadelphia, Pa., a corporation of Delaware No Drawing. Application June 26, 1947, Serial No. 757,344

7 Claims. (Cl. 260—464)

This invention relates to 2-acyl-2-(β-cyanoethyl)-cycloalkanones having the formula

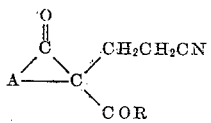

wherein A is an alkylene group having three to four carbon atoms in the alkylene chain thereof and R is a hydrocarbon group, particularly an alkyl group of one to three carbon atoms. This invention is also concerned with the method by which these new compounds are prepared.

While it has been known that various ketones, both open-chained and cyclic, may react with acrylonitrile, it has also been noted that where there are several positions where reaction might occur, methylene groups and methyl groups react even to the exclusion of a methenyl group. On the other hand, it has been found that cyclic ketones having a plurality of carbonyl groups may not react with acrylonitrile when these groups are in 1,3-relationships. Thus, for example, 1,3-cyclohexanedione and methylene-bis-(dihydroresorcin) fail to react with acrylonitrile.

It is, therefore, unexpected to find that acrylonitrile in the presence of an alkaline catalyst reacts with 2-acyl-cycloalkanones to give 2-(β-cyanoethylated) products. One mole of acrylonitrile per mole of 2-acyl-cycloalkanone gives, surprisingly, 2-acyl-2-cyanoethyl-cycloalkanones in high yield.

Of prime importance are the 2-acyl-2-cyanoethyl-cyclohexanones and -cyclopentanones of the formulae:

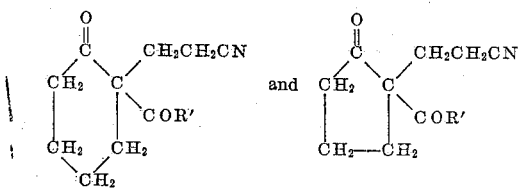

where R' represents an alkyl group of one to three carbon atoms, methyl, ethyl, propyl, and isopropyl, —COR' thus being acetyl, propionyl, or butyryl. These are interesting new products which serve for the preparation of γ-acyl dicarboxylic acids and their functional derivatives. The esters, for example, are exceptionally powerful plasticizers for various resins. In particular, the esters of the new dicarboxylic acids plasticize polyvinyl resins efficiently, providing excellent low-temperature flexibility, being non-volatile, and being effective at concentrations considerably lower than the usual plasticizers.

These new products are formed from such cycloalkanones as 2-acetyl cyclohexanone, 2-acetyl cyclopentanone, 2-propionyl cyclohexanone, 2-propionyl cyclopentanone, 2-butyryl cyclohexanone, 2-butyryl cyclopentanone, 2-isobutyryl cyclohexanone, or 2-isobutyryl cyclopentanone, the acyl groups being those from saturated aliphatic acids of two to four carbon atoms. The starting compound in every case has a —CH= group in the 2-position of the ring, the hydrogen being essential in this position. It is evident that other positions may be substituted in the ring with neutral groups such as methyl, ethyl, butyl, octyl, cyclohexyl, or the like, as in 2-acyl-3-methyl cyclohexanone, 2-acetyl-3-methyl cyclopentanone, 2-acyl-4-methyl cyclohexanone, 2-acyl-6-methyl cyclohexanone, 2-acyl-4-tert.-butyl cyclohexanone, or 2-acyl-6-cyclohexyl cyclohexanone.

As an alkaline condensing agent, there may be used one of the alkali metals themselves or one of their oxides, hydroxides, hydrides, amides, cyanides, or alcoholates. Specific examples of strongly alkaline catalysts are sodium methylate, sodium ethylate, potassium tert.-amylate, potassium, sodium, or lithium hydroxides, sodium metal, sodium oxide, sodium hydride, sodium amide, and the like. There may likewise be used with advantageous outcome the strongly basic organic hydroxides, in particular the quaternary ammonium hydroxides. Typical of these are benzyl triethyl ammonium hydroxide, dibenzyl dimethyl ammonium hydroxide, and benzyl trimethyl ammonium hydroxide. These organic bases may be used in the form of concentrated aqueous solutions. For example, a 40% aqueous solution of benzyl trimethyl ammonium hydroxide, which is commercially available, may be used. One or several of the alkaline condensing agents may be suspended, or preferably dissolved, in the acyl cyclohexanone or a solution thereof in an organic liquid which is inert for the reaction here desired.

Only a small amount of alkaline condensing agent is used, amounts of 1% to 10% of the weight of the 2-acyl cyclohexanone being sufficient to promote the reaction. It is desirable to test the reaction mixture during the course of the reaction to make sure that it is strongly alkaline. If necessary, small amounts of alkaline catalyst may be introduced as the reaction proceeds. When the reaction has run its course, the catalyst is destroyed, as by neutralization with an acid. The desired product may then be readily purified and separated, as by distillation.

The 2-acyl-2-(β-cyanoethyl)-cycloalkanones are prepared by reacting by addition in the presence of an alkaline condensing agent one mole of a 2-acyl cyclohexanone or 2-acyl cyclopentanone and one mole of acrylonitrile. The reaction takes place at temperatures between 10° C. and 85° C., with an initial temperature of reaction between 25° C. and 60° C. being preferred. Solvents, such as dioxane, benzene, tert.-butyl alcohol, and ether, may be used.

The reaction takes place as follows:

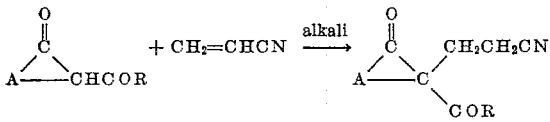

This course of reaction is shown by the fact that the product obtained does not contain an enolizable hydrogen. It is insoluble in cold dilute sodium hydroxide solution and fails to give the purplish color with ferric chloride solution which is characteristic of the 2-acyl cyclohexanones. The outcome of the reaction is a surprising one in view of the usual behavior of cyclic ketones having a 1,3-diketonic arrangement.

When the 2-acyl-2-(β-cyanoethyl)-cyclohexanones or cyclopentanones are boiled with aqueous alkalies, they undergo a cleavage of the ring to yield salts of γ-acyl suberic or azelaic acids from which the acid and ester forms are readily obtainable. This cleavage is, as far as can be determined, dependent upon the particular structure of the compounds of this invention. The cleavage reaction may be represented in the case of acetyl compounds by the following equation:

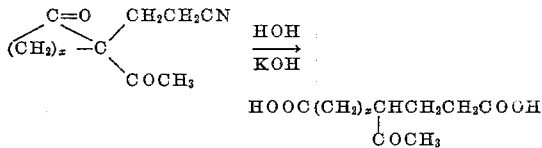

where $x$ is three for cyclopentanones and four for cyclohexanones.

Further details of the preparation of compounds of this invention will be found in the following typical preparations of 2-acyl-2-(β-cyanoethyl)-cyclohexanones and cyclopentanones.

*Example 1*

(a) To a stirred solution of seventy grams of 2-acetyl cyclohexanone, fifty grams of tert.-butyl alcohol, and 2.5 grams of aqueous 40% benzyl trimethyl ammonium hydroxide there was gradually added 26.5 grams of acrylonitrile during the course of fifteen minutes. During this time, the temperature of the reaction mixture rose to 50° C. from its initial temperature of 20° C. Cooling was then applied, and the mixture was allowed to stand at room temperature for twenty-four hours. The solution was then treated with ten grams of 10% hydrochloric acid, washed with water, dried, and distilled under reduced pressure.

The crude 2-(β-cyanoethyl)-2-acetyl cyclohexanone,

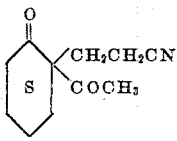

distilled over at 154°–183° C./3–4 mm. as a pale yellow oil in a yield of sixty-five grams, or 67.4%. Upon redistillation, it boiled at 158°–160° C. at 0.10 mm. and solidified on being cooled to a crystalline mass. After recrystallization from ethanol, it formed white crystals melting at 43°–43.5° C., which contained by analysis 68.20% of carbon, 7.90% of hydrogen, and 7.44% of nitrogen, compared with theoretical values of 68.38%, 7.77%, and 7.69%, respectively.

(b) In a similar manner, a mixture of 420 grams of 2-acetyl cyclohexanone, 200 grams of tert.-butyl alcohol, and 150 grams of saturated tert.-butanolic potassium hydroxide solution (about 4% KOH content) was reacted with 159 grams of acrylonitrile at 30°–35° C. The reaction mixture was allowed to stand for twenty-four hours at room temperature. It was then neutralized with dilute hydrochloric acid, washed, dried, and distilled in vacuo.

There was obtained 449 grams of 2-(β-cyanoethyl)-2-acetyl cyclohexanone equivalent to a yield of 7.5%.

By using an equivalent amount of 2-acetyl-6-methyl cyclohexanone and following the same procedure as just shown, one obtains 2-(β-cyanoethyl)-2-acetyl-6-methyl cyclohexanone as a colorless, high-boiling liquid.

*Example 2*

To a stirred solution of 385 grams of 2-propionyl cyclohexanone, 150 grams of tert.-butyl alcohol, and 100 grams of 4% tert.-butanolic potassium hydroxide solution, there was added dropwise 132.5 grams of acrylonitrile during the course of seventy minutes while the reaction temperature was maintained at 45°–50° C. by occasional cooling. After the mixture had stood at room temperature for twenty-four hours, the mixture was acidified with dilute hydrochloric acid, washed with water, and distilled in vacuo to yield 370 grams of 2-(β-cyanoethyl)-2-propionyl cyclohexanone,

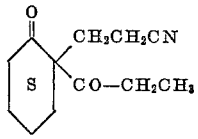

which boiled at 157°–170° C./1 mm. On being allowed to stand, it solidified to a crystalline mass. After recrystallization from alcohol, it formed white crystals melting at 58° C. which contained by analysis 69.76% of carbon, 8.32% of hydrogen, and 6.77% of nitrogen compared with theoretical values of 69.52%, 8.27%, and 6.76%, respectively.

*Example 3*

Acrylonitrile (96 grams) was added dropwise to a stirred solution of 298 grams of 2-butyryl cyclohexanone, 175 grams of tert.-butyl alcohol, and twelve grams of benzyl trimethyl ammonium hydroxide (40% solution) during the course of seventy-five minutes. Since there was no apparent reaction, an additional eight grams of benzyl trimethyl ammonium hydroxide (40% solution) was added, and the temperature was raised to 85° C. for one hour. The mixture was then allowed to stand for forty-eight hours at room temperature, was acidified with fifty grams of 10% hydrochloric acid, and was washed with water. The product was distilled in vacuo to yield 216 grams of 2-(β-cyanoethyl-2-butyryl cyclohexanone,

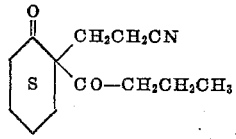

which boiled at 161°–170° C./2 mm. Upon redistillation, it boiled at 159°–162° C./1 mm. and solidified to a crystalline mass. Upon recrystallization from ethanol, it formed colorless crystals which melted at 54° C.

*Example 4*

To a stirred mixture of 77 grams of 2-acetyl cyclopentanone, 61 grams of tert.-butyl alcohol, and five grams of benzyl trimethyl ammonium hydroxide (40% solution), there was added dropwise 32.5 grams of acrylonitrile during the course of thirty minutes. The reaction temperature was maintained at 29°–57° C. by occasional cooling. After the reaction mixture had stood for twenty-four hours at room temperature, the product was made faintly acid with dilute hydrochloric acid, washed with water, and distilled in vacuo.

The 2-($\beta$-cyanoethyl)-2-acetyl cyclopentanone distilled over at 139°–151° C./1 mm. as a pale yellow oil in a yield of seventy-four grams. Upon redistribution, the pure compound boiled at 150°–152° C./ mm. It did not solidify on being allowed to stand. Upon analysis, this material contained 67.13% of carbon, 7.31% of hydrogen, and 7.75% of nitrogen, compared with the theoretical values for $C_{10}H_{13}O_2N$ of 67.00% carbon, 7.31% hydrogen, and 7.82% nitrogen. The refractive index, $n_D^{20}$, was found to be 1.4853 and the density, $d_4^{20}$, was found to be 1.107.

*Example 5*

Acrylonitrile (117 grams) was added dropwise to a stirred solution of 310 grams of 2-propionyl cyclopentanone, eighty grams of tert.-butyl alcohol, and twelve grams of benzyl trimethyl ammonium hydroxide (40% solution) at 25°–35° C. After being allowed to stand for twenty-four hours, the mixture was neutralized with dilute hydrochloric acid and then washed with water. The oil layer, upon distillation in vacuo, gave 366 grams of 2-propionyl-2-($\beta$-cyanoethyl)-cyclopentanone,

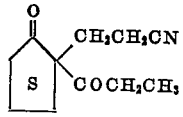

which boiled at 140°–150° C. (1 mm.), had a refractive index, $n_D^{20}$, of 1.4823, and a density, $d_4^{20}$, of 1.085.

*Example 6*

In the manner of Example 5, 133 grams of acrylonitrile was reacted with a mixture of 385 grams of 2-butyryl cyclopentanone, 100 grams of tert.-butyl alcohol, and fifteen grams of benzyl trimethyl ammonium hydroxide to yield 433 grams of 2-butyryl-2-($\beta$-cyanoethyl)-cyclopentanone, which boiled at 148°–152° C. (0.6 mm.), had a refractive index, $n_D^{20}$, of 1.4798 and a density, $d_4^{20}$, of 1.064.

In the same manner, 2-acetyl cyclooctanone yields 2-($\beta$-cyanoethyl)-2-acetyl cyclooctanone and 2-acetyl cycloheptanone yields 2-acetyl-2-cyanoethyl cycloheptanone. These compounds differ, however, from the claimed compounds in their behavior, not yielding dicarboxylic acids by the methods effective with the claimed compounds.

The various nuclear substituted acyl cyclohexanones, such as 4-tert.-butyl-2-acetyl cyclohexanone, 2-cyclohexyl-2-propionyl cyclohexanone, 6-methyl-2-heptoyl cyclohexanone, 4-phenyl-2-benzoyl cyclohexanone, 4-benzyl-2-acetyl cyclohexanone, likewise react with acrylonitrile as described above to yield the corresponding 2-($\beta$-cyanoethyl)-2-acyl cyclohexanones as colorless oils or low-melting solids which, upon alkaline hydrolysis, undergo ring cleavage to yield long-chained dicarboxylic acids possessing an acyl group in the $\gamma$-position.

All of these new acids in the form of their esters, particularly their butyl, amyl, hexyl, 2-ethylhexyl, and butoxyethyl esters, are valuable as plasticizers for polyvinyl chloride and other plastics.

We claim:

1. As a new compound, a 2-($\beta$-cyanoethyl)-2-acyl cycloalkanone having the formula

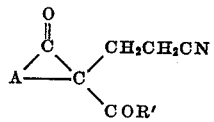

wherein A is an alkylene group of three to four carbon atoms and R' is an alkyl group of one to three carbon atoms.

2. As a new compound,

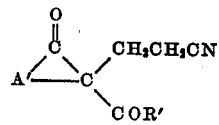

wherein A' is an alkylene chain of four carbon atoms and R' is an alkyl group of one to three carbon atoms.

3. As a new compound,

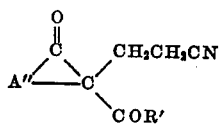

wherein A'' is an alkylene chain of three carbon atoms and R' is an alkyl group of one to three carbon atoms.

4. As a new compound, 2-acetyl-2-($\beta$-cyanoethyl) cyclohexanone.

5. As a new compound, 2-acetyl-2-($\beta$-cyanoethyl) cyclopentanone.

6. As a new compound, a 2-butyryl-2-($\beta$-cyanoethyl) cycloalkanone having five to six carbon atoms in the carbocycle thereof.

7. As a new compound, 2-butyryl-2-($\beta$-cyanoethyl) cyclohexanone.

HARRY R. RATERINK.
HERMAN A. BRUSON.

REFERENCES CITED

The following references are of record in the file of this patent:

UNITED STATES PATENTS

| Number | Name | Date |
| --- | --- | --- |
| 2,386,737 | Bruson | Oct. 9, 1945 |
| 2,394,962 | Bruson | Feb. 12, 1946 |
| 2,403,570 | Wiest | July 9, 1946 |